United States Patent
Telschow et al.

(10) Patent No.: US 8,078,605 B2
(45) Date of Patent: Dec. 13, 2011

(54) USER-SPECIFIC CONTACT APPARATUS AND METHOD

(75) Inventors: Daniel E. Telschow, Provo, UT (US); David Randal Elkington, Springville, UT (US); Thomas Jeffrey Purdy, Springville, UT (US)

(73) Assignee: InsideSales.com, Inc., Provo, UT (US)

( * ) Notice: Subject to any disclaimer, the term of this patent is extended or adjusted under 35 U.S.C. 154(b) by 347 days.

(21) Appl. No.: 12/244,015

(22) Filed: Oct. 2, 2008

(65) Prior Publication Data

US 2010/0088290 A1  Apr. 8, 2010

(51) Int. Cl.
*G06F 17/30* (2006.01)
(52) U.S. Cl. ............................................. 707/706
(58) Field of Classification Search .......... 707/603, 707/607, 694, 702, 706, 781, 784, 802; 709/203
See application file for complete search history.

(56) References Cited

U.S. PATENT DOCUMENTS

| | | | | |
|---|---|---|---|---|
| 7,062,475 | B1* | 6/2006 | Szabo et al. | 706/11 |
| 7,546,630 | B2* | 6/2009 | Tabi | 726/2 |
| 7,739,335 | B2* | 6/2010 | Siegel et al. | 709/206 |
| 8,019,875 | B1* | 9/2011 | Nielsen | 709/227 |
| 2002/0002483 | A1* | 1/2002 | Siegel et al. | 705/10 |
| 2002/0065920 | A1* | 5/2002 | Siegel et al. | 709/227 |
| 2002/0184364 | A1* | 12/2002 | Brebner | 709/224 |
| 2003/0177017 | A1* | 9/2003 | Boyer et al. | 705/1 |
| 2005/0015601 | A1* | 1/2005 | Tabi | 713/182 |
| 2005/0066011 | A1* | 3/2005 | Wicks | 709/217 |
| 2006/0059107 | A1* | 3/2006 | Elmore et al. | 705/64 |
| 2006/0206517 | A1* | 9/2006 | Hyder et al. | 707/102 |
| 2007/0136310 | A1* | 6/2007 | Derrico | 707/10 |
| 2007/0136789 | A1* | 6/2007 | Fotta et al. | 726/3 |
| 2008/0056165 | A1* | 3/2008 | Petrovykh | 370/270 |
| 2009/0170480 | A1* | 7/2009 | Lee | 455/414.1 |
| 2010/0082801 | A1* | 4/2010 | Patel et al. | 709/224 |

* cited by examiner

*Primary Examiner* — Cam-Linh Nguyen

(57) ABSTRACT

An apparatus and method are disclosed for detecting online activity by a user and contacting the user in conjunction with a preferred response plan.

10 Claims, 4 Drawing Sheets

400a 

Dear Eliza,

Thank you for your interest in our products. We invite you to review the following links to learn more about specific products.

Web-based CRM Tools
    JabberDog™
    ResponseSwami™ — 420
  420 — ResponseDealer™
    ResponseVoice™ — 420
  420

If you would like some personal assistance in reviewing our products please click here.

Sincerely,    410a

Dave Elkington, CEO
    InsideSales.com

430 →
```
<img
 src="http://dev.lan.beta/mytest    460
 ?user_id=16777247                  440
 &contact_plan=2357                 450
 &offer_id=522                      450
>
```

400b 

Eliza,

Thank you for selecting insidesales.com as your CRM solution provider. We look forward to helping you grow your business. As a token of our appreciation we are providing you with the following private links. For prompt personalized assistance, please click on any of the following links:

CRM Tools Support:
    Importing Account Data — 410
  410 — Generating Sales Reports
    Other Issues — 410

Upgrades:
    Additional User Licenses
  410 — More Accounts
    Other Upgrades — 410
  410

Referrals:
    USA
  410 — International

Info On Other Products:
    JabberDog™ — 420
    ResponseSwami™
    ResponseDealer™
  420 — ResponseVoice™ — 420
  420

Best Regards,

Dave Elkington, CEO
    InsideSales.com

Fig. 4

USER-SPECIFIC CONTACT APPARATUS AND METHOD

BACKGROUND OF THE INVENTION

1. Field of the Invention

This invention relates to contacting users in response to detecting online activity by the user.

2. Description of the Related Art

Enterprises often have contact information for many users but are often unaware of a when and how to contact each user to optimize the contact experience.

SUMMARY OF THE INVENTION

The various embodiments presented herein have been developed in response to the present state of the art, and in particular, in response to the problems and needs in the art that have not yet been fully solved by currently available user contact systems and methods. Accordingly, the various embodiments presented herein have been developed to provide at least one method and apparatus for contacting users that overcome shortcomings in the art.

Certain embodiments of a user-specific response apparatus disclosed herein include a data storage module that receives contact information for a user and stores the contact information in a user-specific profile, and a user activity detection module that initiates transmission of one or more user-specific access tokens to the user, receives a user-specific access token, and provides notification of online activity by the user to a dialing module that dials a contact telephone number in response to receiving the notification of online activity by the user. Some embodiments also include a response plan selection module that selects a preferred response plan for the user and an agent selection module that connects the user to an agent having a skill set specified by the preferred response plan.

The user-specific access token may be provided to the user via a browser cookie, a URL, or similar mechanism. In certain embodiments, a plurality of user-specific URLs are transmitted to the user. One or more URLs may be embedded in an electronic message such as an email message. Each URL may correspond to a particular offer or service. In some embodiments, access related information such as a user access time, a user access location, and a selected URL or series of selected URLs may be received in conjunction with receiving the user-specific access token.

Certain embodiments of a user-specific response method disclosed herein include performing the operations associated with the user-specific response apparatus such as receiving contact information for a user including a contact telephone number, storing the contact information in a user-specific profile, transmitting at least one user-specific access token to the user, receiving a user-specific access token in response to online activity by the user, dialing the contact telephone number in response to receiving the user-specific access token and in accordance with a delay time specified by a preferred response plan, and connecting the user to an agent having a skill set specified by the preferred response plan. Certain embodiments may also including selecting a preferred response plan and adjusting the preferred response plan according to the access related information. The preferred response plan may specify a variety of parameters related to contacting a user including those mentioned above. In some embodiments, the same response plan may be preferred for more than one user and referenced in more than one user profile or similar record.

The methods and apparatus described herein may be embodied partially or wholly as a computer program product or computer readable medium bearing computer usable program codes executable to perform operations to accomplish the described operations. It should also be noted that references throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 4 is a text diagram illustrating two examples of messages containing interface elements for providing user-specific responses.

DETAILED DESCRIPTION OF THE INVENTION

Figure 1:
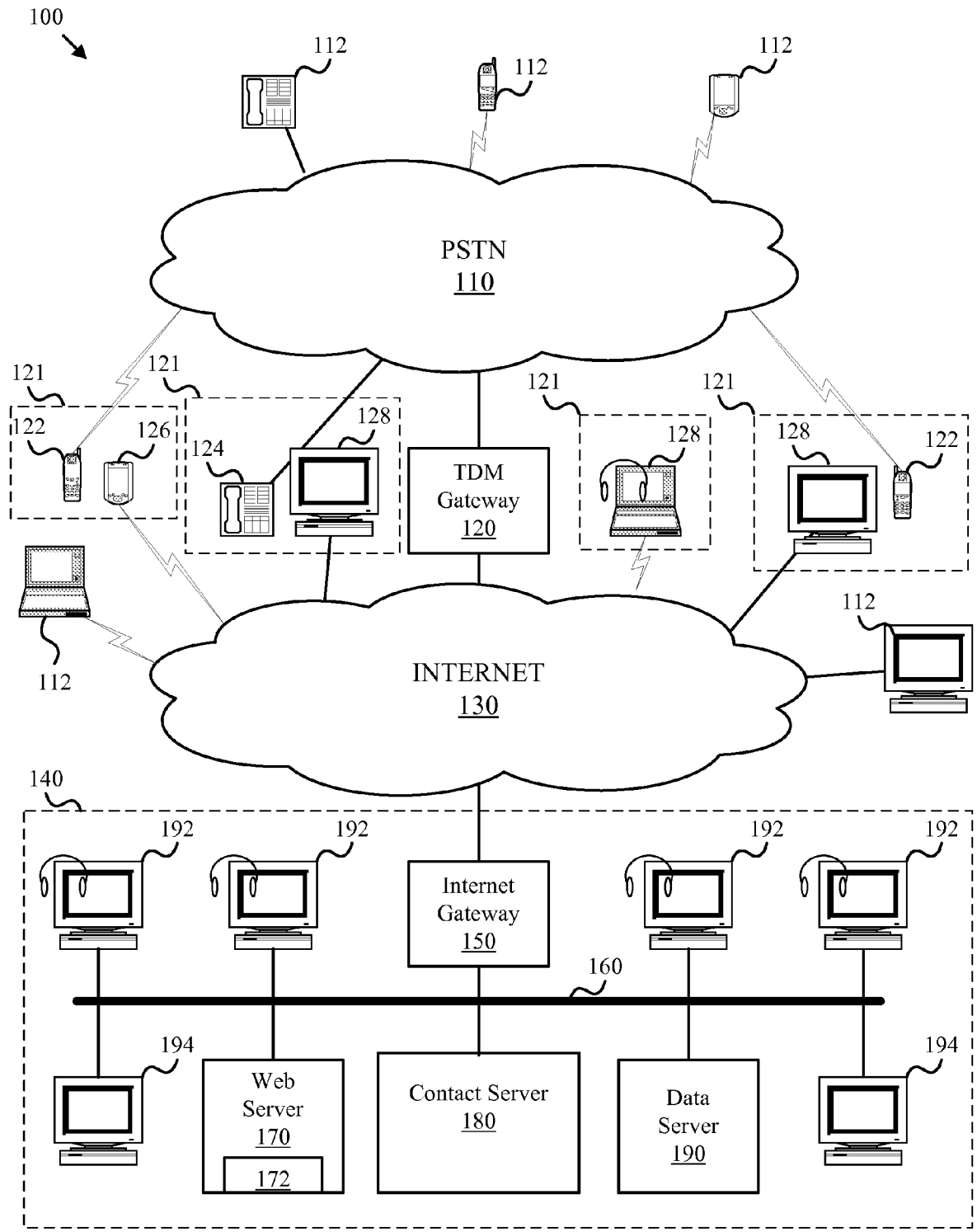
FIG. 1 is a schematic block diagram illustrating one embodiment of a user-specific response system in accordance with the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, across several memory devices and/or computing devices such as servers. Similarly, operational data may be identified and illustrated herein within modules, and may be embodied in any suitable form and organized within any suitable type of data structure. The operational data may be collected as a single data set, or may be distributed over different locations including over different storage devices and/or computing devices such as servers.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a computer-readable medium may take any form capable of causing execution of a program of machine-readable instructions on a digital processing apparatus. A computer-readable may be embodied by a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

FIG. 1 is a schematic block diagram illustrating one particular embodiment of a user-specific contact system 100 in accordance with the present invention. As depicted, the user-specific contact system 100 includes various components such as a public switched telephone network (PSTN) 110, user communication and/or computing devices 112, a TDM gateway 120 connecting the PSTN to an internet 130, remote agent stations 121, workstations 128, a call center 140, an internet gateway 150 connecting a local area network 160 to the internet 130, and various servers such as a web server 170, a contact server 180, and a data server 190, local agent workstations 192, and control workstations 194. The particular embodiment 100 is one example of components that can be operably interconnected to provide a user-specific contact system wherein the components function collaboratively to improve contact success rates.

In the depicted embodiment, the remote agent stations 121 include wireless phones 122, wired phones 124, wireless computing devices 126, and workstations 128. In certain embodiments, the wireless phones 122 or the wired phones 124 may be VOIP phones. In some embodiments, the computing devices 126 or the workstations 128 may be equipped with a soft phone. The remote agent stations 121 enable agents to provide services from remote locations similar to agents stationed at the workstations 192 and directly connected to the local area network 160.

In one embodiment, the local area network 160 resides within a call center 140 that uses VoIP and other messaging services to contact users connected to the PSTN 110 and/or the internet 130. The various servers in the call center 140 function cooperatively to receive inquiries from users, contact users, provide customer data to agents via agent terminals such as the local agent workstations 192 and the remote agent stations 121, and connect the agents to the users. The users may be connected to the PSTN 110, the internet 130, or the like.

The web server 170 may provide one or more web forms 172 to users via browser displayable web pages. The web forms may be displayed to the users via a variety of communication and/or computing devices 112 including phones, laptop computers, desktop computers, media players, and the like that are equipped with a browser. In the depicted embodiment, the web forms 172 prompt the user for contact data such as name, address, phone number, fax number, email address, instant messaging address, referral information, availability information, and interest information. The web server 170 may receive the contact data associated with the user in response to the user submitting the web form and provide the contact data to contact server 180, the data server 190, or the like.

The contact server 180, the data server 190, or the like may receive the contact data and retrieve additional data associated with the user such as web analytics data, reverse lookup data, credit check data, web site data, web site rank information, do-not-call registry data, data from a CRM database, and background check information. The data server may store the collected data in a user profile (not shown) and associate the user with a preferred response plan (not shown).

The contact server 180 or the like may contact the user in accordance with the preferred response plan and deliver information on the user to an agent to enable the agent to achieve a particular purpose such as such as establishing a relationship with the user, thanking the user for their interest in a product, answering questions from the user, informing the user of a product or service offering, selling a product or service, surveying the user on their needs and preferences, and providing support to the user. The contact server 180 may deliver the information to the agent using a variety of delivery services such as email services, instant messaging services, short message services, enhanced messaging services, text messaging services, telephony-based text-to-speech services, and multimedia delivery services. The agent terminals 121 or 192 may visually or sonically present the information on the user and enable the agent to communicate with the user.

In the depicted embodiment, the web server 170 or some other component of the system 100 may detect online activity by a particular user and provide notification of the online activity to the contact server 180. Examples of online activity include opening an email and/or an electronic document attached thereto, visiting a web page, clicking on a URL, and the like. The detected online activity (or similar form of presence detection) maybe leveraged to contact the user at a particular location and/or time and in a particular manner that increases contact success rates.

For example, the web server 170 may detect user access to a user-specific URL that was previously transmitted to the user. The user-specific URL may correspond to a particular offering such as product, service, technology, news story, promotional, white paper, or the like. The contact server 180 may contact the user in response to user access to the user-specific URL and thereby initiate contact at a time that the user is available and contemplating the particular offering. Furthermore, the contact attempt may occur in conjunction with a response plan that is specifically selected for the specific user and/or offering and the user may also be connected with an agent specifically selected for the specific user and/or offering who approaches the user in a manner specifically selected for the particular specific user and/or offering. The use of user-specific URL's or a similar form of presence detection thereby facilitates providing a user-specific contact experience (and also an offer-specific experience) to a wide variety of users.

Figure 2:
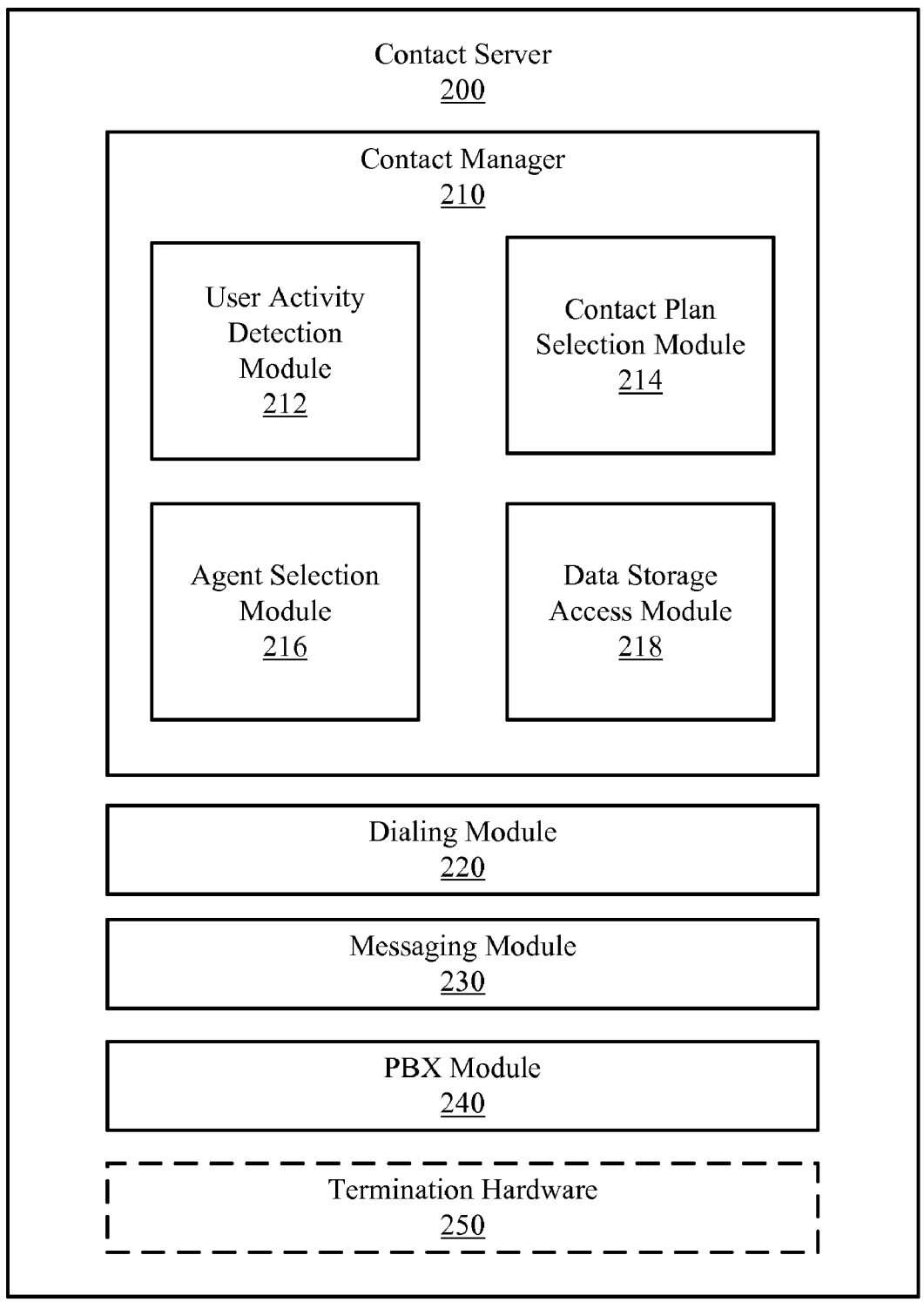
FIG. 2 is a schematic block diagram illustrating one embodiment of a contact server in accordance with the present invention.

FIG. 2 is a schematic block diagram illustrating one embodiment of a contact server 200 in accordance with the present invention. As depicted, the contact server 200 includes a contact manager 210, a dialing module 220, a messaging module 230, a PBX module 240 and termination hardware 250. In the depicted embodiment, the contact manager includes a user activity detection module 212, a response plan selection module 214, an agent selection module 216, and a data storage access module 218. Although shown within the contact server 200, the depicted modules may reside partially or wholly on other servers such as the web server 170 and the data server 190. The contact server 200 enables an agent to contact a user in conjunction with a response plan and is one example of the contact server 180 depicted in FIG. 1.

The contact manager 210 establishes contact with users and agents and manages contact sessions where needed. The contact manager 210 may initiate contact via the dialing module 220 and/or the messaging module 230.

The user activity detection module 212 detects online activity or a similar form of activity or presence by a particular user. In certain embodiments, user activity is detected via a user-specific access token. In some embodiments, access related information such as a user access time, a user access location, and a selected URL may be received in conjunction with receiving the user-specific access token.

The user-specific access token may have been provided to the user via a browser cookie, a URL, or similar mechanism by the detection module 212 or some other module or server within the system 100. In certain embodiments, a plurality of user-specific URLs are transmitted to the user via the messaging module 230. For example, one or more URLs may be embedded in an electronic message such as an email message. Each URL may correspond to a particular offer or service.

The response plan selection module 214 selects a response plan that is preferred for the particular user and/or offering. Similarly, the agent selection module 216 selects an agent, class of agent, or agent skill set that is preferred for the particular user and/or offering. In one embodiment, the agent, class of agent, or agent skill set is stored in the preferred response plan.

The data storage access module 218 enables the contact manager to access contact data, CRM data, or the like that is useful for contacting users. In one embodiment, the data storage access module 218 enables the contact manager 210 to access the data server 190 or the like.

The dialing module 220 establishes telephone calls including VOIP telephone calls and PSTN calls. In one embodiment, the dialing module 220 receives a unique call identifier, establishes a telephone call, and notifies the contact manager that the call has been established. Various embodiments of the dialing module 220 incorporate auxiliary functions such as retrieving telephone numbers from a database, comparing telephone numbers against a restricted calling list, transferring a call, conferencing a call, monitoring a call, playing recorded messages, detecting answering machines, recording voice messages, and providing interactive voice response (IVR) capabilities. In some instances, the dialing module 220 directs the PBX module 240 to perform the auxiliary functions.

The messaging module 230 sends and receives messages to agents and users. The messages may contain or reference one or more user-specific access token. To send and receive messages, the messaging module 230 may leverage one or more delivery or messaging services such as email services, instant messaging services, short message services, and enhanced messaging services.

The PBX module 240 connects a private phone network to the public switched telephone network (PSTN) or the like. The contact manager 210 or dialing module 220 may direct the PBX module 240 to connect a line on the private phone network with a number on the PSTN or internet. In some embodiments, the PBX module 240 provides some of the auxiliary functions invoked by the dialing module 220.

The termination hardware 250 routes calls from a local network to the public switched telephone network (PSTN). In one embodiment, the termination hardware 250 interfaces to conventional phone terminals. In some embodiments and instances, the termination hardware 250 provides some of the auxiliary functions invoked by the dialing module 220.

Figure 3:
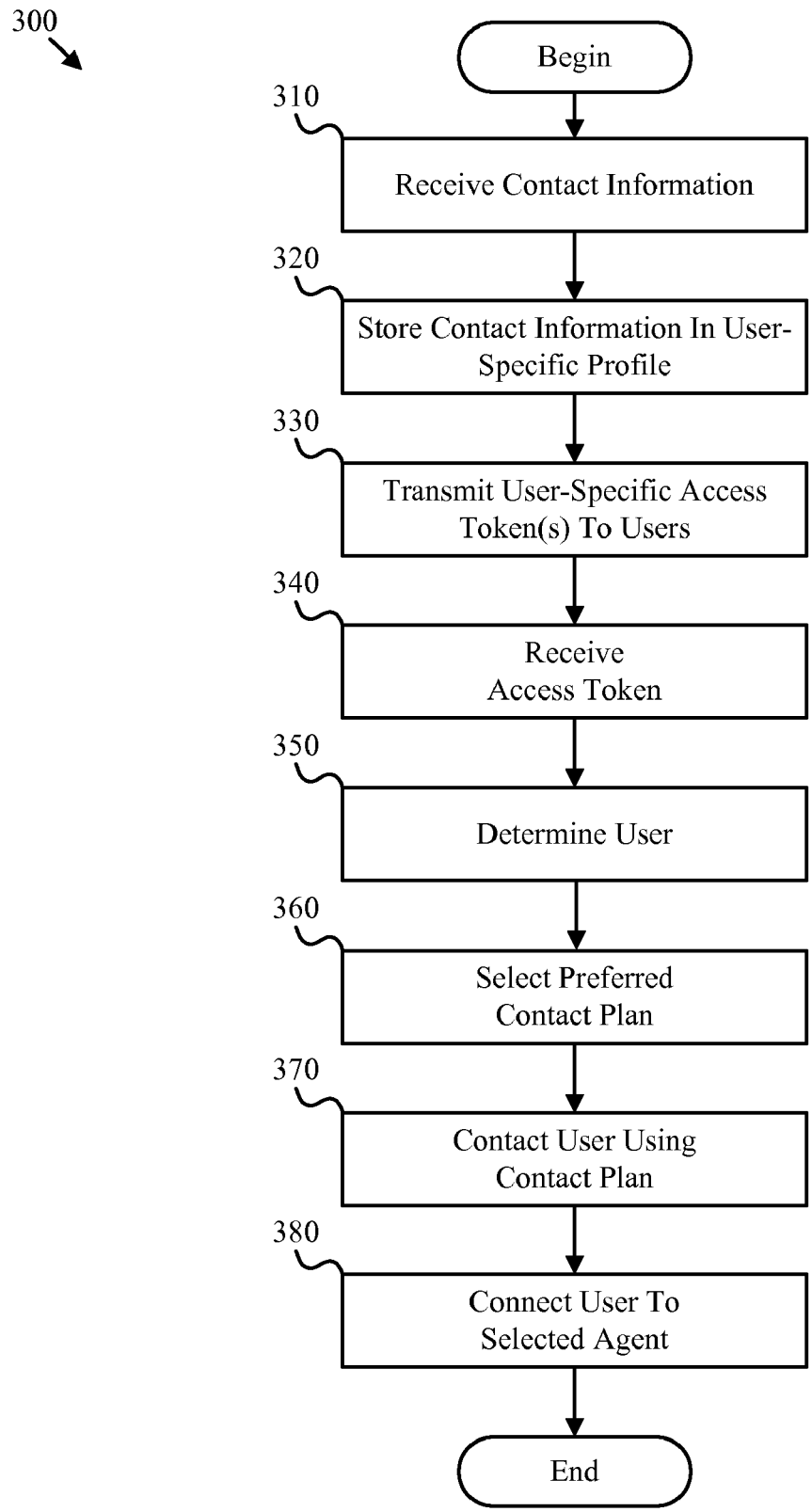
FIG. 3 is a schematic flow chart diagram illustrating one embodiment of a user-specific response method in accordance with the present invention.

FIG. 3 is a schematic flow chart diagram illustrating one embodiment of a user-specific contact method 300 in accordance with the present invention. As depicted, the user-specific contact method 300 includes receiving 310 contact information, storing 320 contact information in a user-specific profile, transmitting 330 user-specific access tokens to one or more users, receiving 340 a user-specific access token, determining 350 the user from the access token, selecting 360 a preferred response plan, contacting 370 the user in accordance with the response plan, and connecting 380 the user to a selected agent. The contact method 300 may be conducted wholly or partially by the contact manager 210 depicted in FIG. 2.

Receiving 310 contact information may include receiving information from web forms and/or other sources of contact data. Examples of contact information include name, address, phone number, fax number, email address, instant messaging address, referral information, availability information, interest information, or the like. Storing 320 contact information in a user-specific profile may include writing the information to one or more records in a database such as CRM database.

Transmitting 330 user-specific access tokens to one or more users may include sending a browser cookie, an email message, a text message, or the like with the user-specific access tokens embedded therein or associated therewith. In one embodiment, a document or web page containing the user-specific access tokens is transmitted to the user via some form of electronic messaging. In another embodiment, a browser cookie containing one or more user-specific access tokens is provided to a user's browser equipped device.

Receiving 340 a user-specific access token may occur in conjunction with receiving an http request, an email message, a browser cookie, or the like. Determining 350 the user from the access token may include accessing a table or other mapping mechanism that identifies the specific user from the access token. In one embodiment, a user identifier is embedded within the access token.

Selecting 360 a preferred response plan may include analyzing user data and/or previous contact experiences to determine a response plan with a highest likelihood of success. In on embodiment, the preferred response plan is pre-determined and stored or referenced in a user profile. In another embodiment, the preferred response plan is determined in response to receiving 340 the user-specific access token.

Contacting 370 the user in accordance with the preferred response plan may include contacting at a time and method specified by the preferred response plan. The contact time may be a relative time such as 13 minutes after reception of an access token or an absolute time such as 8 pm on a Tuesday, or a range such as more than 10 minutes and less than 20 minutes after reception of an access token. The specified contact time may be dependent on the particular access token, URL, or offering. In certain embodiments, a contact time of "As soon as possible" (ASAP) may be specified. For one offering, a contact time within 5 minutes of reception of an access token was found to yield superior results. For other offerings, a contact time of the next business day at approximately the same time may provide superior results.

Connecting 380 the user to a selected agent may include connecting to an agent that has a specific skill set or background that is appropriate for the user. Connecting 380 may also include visually and/or sonically presenting information regarding the user to the agent via an agent terminal or the like.

FIG. 4 is a text diagram illustrating two examples of user-specific messages 400. As shown, the user-specific messages 400 may include one or more user-specific links 410 as well as conventional links 420. The messages 400 enable presence detection and user-specific contact attempts. Although depicted as messages, the same methodologies may be applied to web site pages or the like, using cookies, user-specific links, or similar means.

The depicted user-specific messages 400 include a personal invitation 400a and an order confirmation 400b. The personal invitation 400a may be sent in response to receiving a literature request or the like. The user may receive the personal invitation and subsequently elect to access or interact with the personal invitation 400a. In one embodiment, opening a message 400 initiates transmission of a user-specific access token to a contact server 180 or the like. In response thereto, the contact server may contact the user in accordance with a preferred response plan.

As shown on the lower left of FIG. 4 for one particular link 410a, the (undisplayed) link codes 430 associated with each user-specific link 410 may include a user-specific access token 440 as well as other embedded codes 450. In the depicted embodiment, the URL 460 is appended with the link codes 430 and selection of the link 410a by the user initiates an http or similar request to a contact server requesting access to a resource specified by the URL 460. In response to receiving the http or similar request, a server such as the contact server 180 may receive a user-specific access token and contact the user in accordance with a response plan associated with the user and/or offer.

In the depicted embodiment, the user-specific access token 440 is a numerical user ID that may be used to retrieve user-specific records. In another embodiment, the user-specific access token 440 indicates the response plan selected for the user. In yet another embodiment, the other embedded codes 450 contain parameters necessary to execute a pre-selected response plan.

The embodiments described herein enable an enterprise to contact users in a manner that can customize the contact experience for each user and increase contact success rates. The embodiments described herein may be embodied in other specific forms without departing from their spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A system for detecting user activity and connecting active users to agents matching skill sets, the system comprising:
   a connection device including processing facilities for executing software and further including network facilities for electronic communication over a network, said connection device further including a storage device group containing at least one storage device operable to contain operating system files and applications; and
   instructions stored to said storage device group, said instructions being further executable by said processing facilities to achieve the functions of:
   (i) receiving contact information for a user, the contact information including a telephone number,
   (ii) storing contact information received for a user in a user-specific profile,
   (iii) creating a user-specific access token corresponding to a user from which contact information has been received,
   (iv) transmitting a user-specific access token to its corresponding user by way of said network facilities,
   (v) selecting a response plan for a user corresponding to a created user-specific access token, the selected response plan specifying a delay time and an agent skill set,
   (vi) following said transmission, receiving by way of said network facilities at times of user activity the user-specific access token corresponding to the active user,
   (vii) upon reception of a user-specific access token, identifying the response plan selected for the user corresponding to the received user-specific access token,
   (viii) upon identification of a response plan, executing a delay time specified by the identified response plan selected for the user of the corresponding received user-specific access token,
   (ix) following reception of a user-specific access token, retrieving the telephone number included within the received contact information for the user of the corresponding received user-specific access token,
   (x) following the execution of a delay time specified by an identified response plan, executing a step to initiate a telephone call to the retrieved telephone number included within the received contact information for the user of the corresponding received user-specific access token, and
   (xi) following the identification of a response plan, selecting an agent having a skill set specified by the identified response plan.

2. A system according to claim 1, further comprising telephonic equipment functional to initiate a telephone call to a selected telephone number, and further wherein said instructions are further executable to perform the function of: (xii) following the execution of a delay time specified by an identified response plan, dialing the telephone number included within the received contact information for the user of the corresponding received user-specific access token.

3. A system according to claim 1, wherein the user-specific access token is a browser cookie.

4. A system according to claim 1, wherein the user-specific access token corresponds to a URL.

5. A system according to claim 1, wherein in the transmitting a user-specific access token, a plurality of URLs are transmitted, each URL corresponding to a particular offer or service.

6. A system according to claim 5, wherein said transmission of said plurality of URLs is by way of an email message containing the plurality of URLs.

7. A system according to claim 1, wherein in the reception of user-specific access tokens, information relating to the access of the active user is received.

8. A system according to claim 1, wherein said instructions are further executable to perform the function of: (xi) adjusting a response plan according to received access related information.

9. A system according to claim 1, wherein said instructions are executable to select a response plan for a user specifying a delay time as soon as possible, and further wherein in the execution of a delay time, said instructions are executable to delay the execution of a step to initiate a telephone call to the retrieved telephone number as soon as possible if so specified within a selected response plan.

10. A method for detecting user activity and connecting active users to agents matching skill sets, said method utilizing a network and a storage device, said method comprising:

receiving contact information for a user, the contact information including a telephone number;

storing contact information received for a user in a user-specific profile on the storage device;

transmitting a user-specific access token to its corresponding user over the network;

selecting a response plan for a user corresponding to a transmitted user-specific access token, the selected response plan specifying a delay time and an agent skill set;

receiving over the network at times of user activity the user-specific access token corresponding to the active user;

identifying the response plan selected for the user corresponding to the received user-specific access token;

upon identification of a response plan, executing a delay time specified by the identified response plan selected for the user of the corresponding received user-specific access token;

retrieving the telephone number included within the stored contact information for the user of the corresponding received user-specific access token;

following the execution of a delay time specified by an identified response plan, placing a telephone call to the telephone number included within the received contact information for the user of the corresponding received user-specific access token;

selecting an agent having a skill set specified by the identified response plan; and connecting the user to the selected agent.

* * * * *